US012715211B2

(12) United States Patent
Miyagishi et al.

(10) Patent No.: US 12,715,211 B2
(45) Date of Patent: Aug. 25, 2026

(54) LIQUID EJECTING APPARATUS AND METHOD OF DRIVING LIQUID EJECTING APPARATUS

(71) Applicant: SEIKO EPSON CORPORATION, Tokyo (JP)

(72) Inventors: Akira Miyagishi, Shiojiri (JP); Asami Okamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 193 days.

(21) Appl. No.: 18/616,316

(22) Filed: Mar. 26, 2024

(65) Prior Publication Data

US 2024/0326418 A1 Oct. 3, 2024

(30) Foreign Application Priority Data

Mar. 29, 2023 (JP) ................................ 2023-054119

(51) Int. Cl.
*B41J 2/045* (2006.01)

(52) U.S. Cl.
CPC ....... *B41J 2/04588* (2013.01); *B41J 2/04563* (2013.01); *B41J 2/04573* (2013.01); *B41J 2/04581* (2013.01)

(58) Field of Classification Search
None
See application file for complete search history.

(56) References Cited

U.S. PATENT DOCUMENTS 6,382,754 B1 * 5/2002 Morikoshi ........... B41J 2/04581 347/11
2004/0223027 A1 11/2004 Shinkawa
2006/0187249 A1 * 8/2006 Nishihara ........... B41J 2/17566 347/7
2015/0062226 A1 * 3/2015 Otokita ................ B41J 2/04581 347/14
2017/0057225 A1 3/2017 Kamiyanagi
(Continued)

FOREIGN PATENT DOCUMENTS

JP 2004-276544 A 10/2004
JP 2007-111981 A 5/2007
(Continued)

*Primary Examiner* — Ricardo I Magallanes
*Assistant Examiner* — Shlomit Chelst
(74) *Attorney, Agent, or Firm* — WORKMAN NYDEGGER

(57) ABSTRACT

An inspection signal includes a first potential-changing element having a potential that changes from a first potential to a second potential in one direction in a first time period, a first potential-maintaining element having the second potential maintained in a second time period immediately after the first time period, a second potential-changing element having a potential that changes from the second potential to a third potential in the other direction in a third time period immediately after the second time period, and a second potential-maintaining element having the third potential maintained in a fourth time period immediately after the third time period. When a natural vibration period of an ejecting section is TC, a length of the first time period is equal to or longer than 0.75×TC. A vibration detector detects a residual vibration in a detection period included in the fourth time period.

13 Claims, 9 Drawing Sheets

(56) References Cited

U.S. PATENT DOCUMENTS

2018/0134034 A1* 5/2018 Fukuda ................ B41J 2/04541
2019/0263112 A1* 8/2019 Shinkawa .............. B41J 2/0451

FOREIGN PATENT DOCUMENTS

| | | | |
|---|---|---|---|
| JP | 2009-066948 | A | 4/2009 |
| JP | 2017-047529 | A | 3/2017 |
| JP | 2017-149084 | A | 8/2017 |
| JP | 2019-142106 | A | 8/2019 |

* cited by examiner

FIG. 7

| Sd[m] | DESIGNATION BY Sd[m] | Qa[m] | | Qb[m] | | | Qs[m] | | |
|---|---|---|---|---|---|---|---|---|---|
| | | TQ1 | TQ2 | TSS1 | TSS2 | TSS3 | TSS1 | TSS2 | TSS3 |
| 1 | DP-1 | H | H | L | L | L | L | L | L |
| 2 | DP-2 | H | L | L | L | L | L | L | L |
| 3 | DP-3 | L | H | L | L | L | L | L | L |
| 4 | DP-4 | L | L | L | L | L | L | L | L |
| 5 | DS | L | L | H | L | H | L | H | L |

LIQUID EJECTING APPARATUS AND METHOD OF DRIVING LIQUID EJECTING APPARATUS

The present application is based on, and claims priority from JP Application Serial Number 2023-054119, filed Mar. 29, 2023, the disclosure of which is hereby incorporated by reference herein in its entirety.

BACKGROUND

1. Technical Field

The present disclosure relates to a liquid ejecting apparatus and a method of driving a liquid ejecting apparatus.

2. Related Art

A liquid ejecting apparatus such as an ink jet printer that ejects liquid such as ink from an ejecting section to form an image on a medium such as a recording sheet is widely used. In the liquid ejecting apparatus, an ejection abnormality in which liquid is not normally ejected from the ejecting section may occur, and the quality of an image formed on the medium may decrease due to the ejection abnormality. To recognize such an ejection abnormality, a technique relating to ejection state determination and provided for determining a liquid ejection state of an ejecting section has been proposed. For example, JP-A-2004-276544 describes a technique relating to ejection state determination and provided for determining a liquid ejection state of an ejecting section based on characteristics such as the amplitude and the period of a residual vibration that occurs in the ejecting section driven with a drive signal for inspection.

However, the characteristics of the residual vibration that occurs in the ejecting section driven with the drive signal for inspection may vary due to manufacturing variance in the ejecting section or the like. In addition, the accuracy of determining the liquid ejection state of the ejecting section may decrease due to such variance in the characteristics of the residual vibration.

SUMMARY

According to an aspect of the present disclosure, a liquid ejecting apparatus includes an ejecting section that ejects liquid within a pressure chamber according to deformation of a piezoelectric element, a generator that generates an inspection signal that deforms the piezoelectric element, and a vibration detector that detects a residual vibration occurring in the ejecting section after the inspection signal is supplied to the piezoelectric element. The inspection signal includes a first potential-changing element having a potential that changes from a first potential to a second potential in one direction in a first time period, a first potential-maintaining element having the second potential maintained in a second time period immediately after the first time period, a second potential-changing element having a potential that changes from the second potential to a third potential in the other direction in a third time period immediately after the second time period, and a second potential-maintaining element having the third potential maintained in a fourth time period immediately after the third time period. When a natural vibration period of the ejecting section is TC, a length of the first time period is equal to or longer than 0.75×TC. The vibration detector detects the residual vibration in a detection period included in the fourth time period.

According to another aspect of the present disclosure, a method of driving a liquid ejecting apparatus including an ejecting section that ejects liquid within a pressure chamber according to deformation of a piezoelectric element, a generator that generates an inspection signal that deforms the piezoelectric element, and a vibration detector that detects a residual vibration occurring in the ejecting section after the inspection signal is supplied to the piezoelectric element. The method includes causing the generator to generate the inspection signal including a first potential-changing element having a potential that changes from a first potential to a second potential in one direction in a first time period, a first potential-maintaining element having the second potential maintained in a second time period immediately after the first time period, a second potential-changing element having a potential that changes from the second potential to a third potential in the other direction in a third time period immediately after the second time period, and a second potential-maintaining element having the third potential maintained in a fourth time period immediately after the third time period, and causing the vibration detector to detect the residual vibration in a detection period included in the fourth time period. When a natural vibration period of the ejecting section is TC, a length of the first time period is equal to or longer than 0.75×TC.

BRIEF DESCRIPTION OF THE DRAWINGS

FIG. 7 is an explanatory diagram illustrating a relationship between an individual specifying signal, a first coupling state specifying signal, a second coupling state specifying signal, and a third coupling state specifying signal in the unit time period.

DESCRIPTION OF EMBODIMENTS

Figure 1:
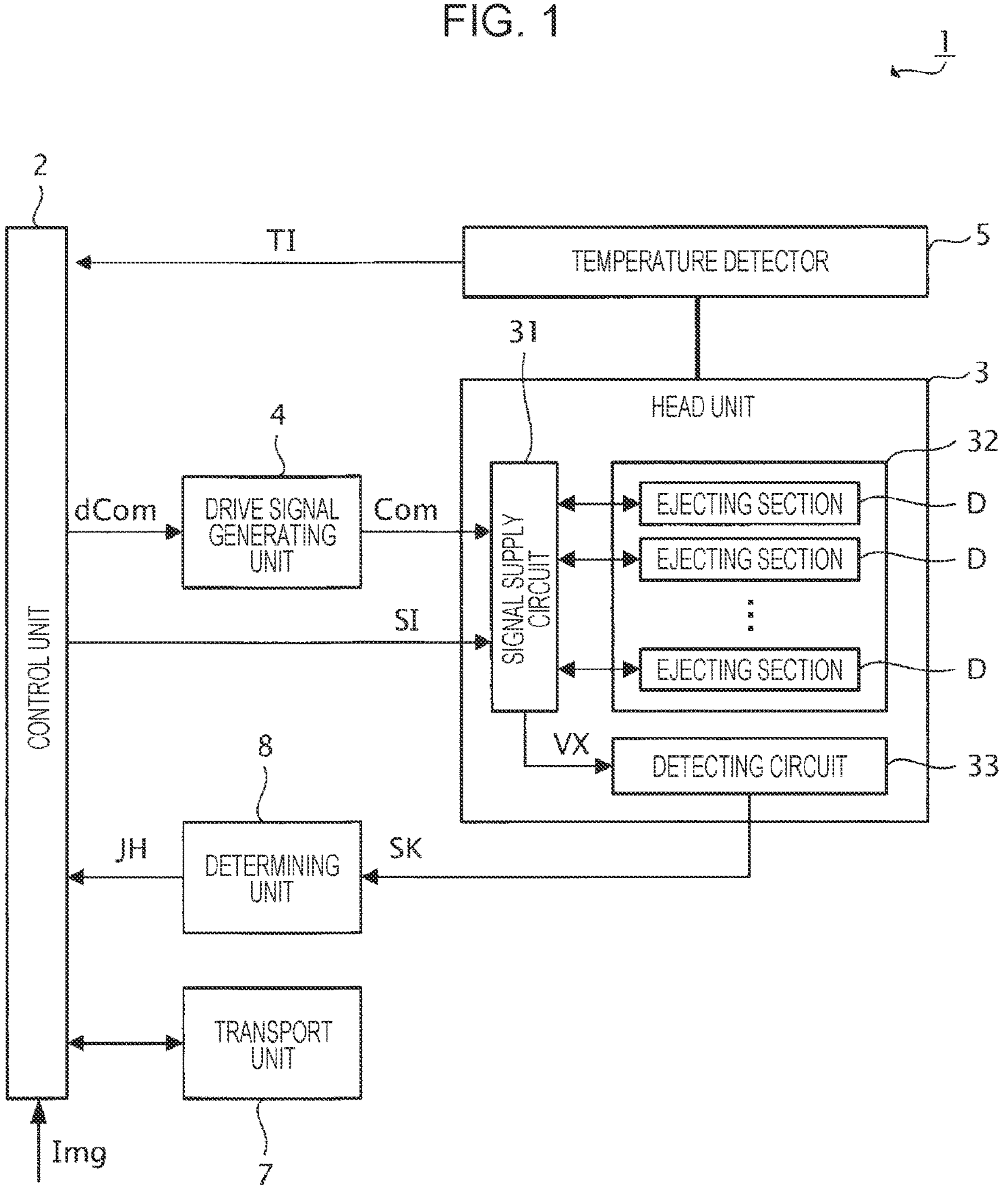
FIG. 1 is a block diagram illustrating an example of a configuration of an ink jet printer according to an embodiment of the present disclosure.

Embodiments of the present disclosure are described below with reference to the drawings. However, in the drawings, dimensions and scales of components are different from those of the actual components as appropriate. In addition, since the embodiments described below are specific examples of the present disclosure, various technically preferable limitations are given. However, the scope of the present disclosure is not limited to the embodiments unless otherwise stated to limit the present disclosure in the following description.

1. First Embodiment

A first embodiment describes a liquid ejecting apparatus while exemplifying an ink jet printer that ejects ink to form an image on a recording sheet P. In the first embodiment, the ink is an example of "liquid", and the recording sheet P is an example of a "medium". The ink jet printer 1 according to the first embodiment is described below with reference to FIGS. 1 to 10. The ink jet printer 1 is an example of the "liquid ejecting apparatus".

1-1. Overview of Ink Jet Printer

FIG. 1 is a functional block diagram illustrating an example of a configuration of the ink jet printer 1.

As illustrated in FIG. 1, print data Img indicating an image to be formed by the ink jet printer 1 is supplied to the ink jet printer 1 from a host computer such as a personal computer or a digital camera. The ink jet printer 1 performs print processing of forming, on the recording sheet P, the image indicated by the print data Img supplied from the host computer.

As illustrated in FIG. 1, the ink jet printer 1 includes a control unit 2 that controls components of the ink jet printer 1, a head unit 3 including an ejecting section D that ejects the ink, a drive signal generating unit 4 that generates a drive signal Com for driving the ejecting section D, a temperature detector 5 that detects the temperature of the head unit 3 including the ejecting section D, a transport unit 7 that changes a relative position of the recording sheet P to the head unit 3, and a determining unit 8 that determines an ink ejection state of the ejecting section D.

In the present embodiment, it is assumed that the ink jet printer 1 includes one or more head units 3, one or more drive signal generating units 4 corresponding to the one or more head units 3 on a one-to-one basis, and one or more determining units 8 corresponding to the one or more head units 3 on a one-to-one basis. However, for convenience of explanation, as illustrated in FIG. 1, the following description focuses on one of the one or more head units 3, one drive signal generating unit 4 provided corresponding to the one head unit 3 among the one or more drive signal generating units 4, and one determining unit 8 provided corresponding to the one head unit 3 among the one or more determining units 8.

The control unit 2 includes one or more central processing units (CPUs). However, the control unit 2 may include a programmable logic device such as a field-programmable gate array (FPGA) instead of or in addition to the one or more CPUs. In addition, the control unit 2 includes, for example, either one or both of a volatile memory such as a random-access memory (RAM) and a nonvolatile memory such as a read-only memory (ROM), an electrically erasable programmable read-only memory (EEPROM) or a programmable ROM (PROM).

The control unit 2 generates signals for controlling an operation of each of the components of the ink jet printer 1. The signals are a print signal SI, a waveform specifying signal dCom, and the like, which are described later in detail.

The waveform specifying signal dCom is a digital signal defining a waveform of a drive signal Com. The drive signal Com is an analog signal for driving the ejecting section D. In the present embodiment, it is assumed that the drive signal Com includes a drive signal Com-A and a drive signal Com-B. The drive signal generating unit 4 includes a DA conversion circuit and generates the drive signal Com having the waveform defined by the waveform specifying signal dCom. The print signal SI is a digital signal for specifying a type of operation of the ejecting section D. Specifically, the print signal SI is a signal specifying the type of operation of the ejecting section D by specifying whether to supply the drive signal Com to the ejecting section D. The drive signal generating unit 4 is an example of a "generator".

As illustrated in FIG. 1, the head unit 3 includes a supply circuit 31, a recording head 32, and a detecting circuit 33.

The recording head 32 includes a number M of ejecting sections D. The value M is a natural number satisfying "M≥1". The recording head 32 is an example of a "liquid ejecting head". An m-th ejecting section D among the number M of ejecting sections D included in the recording head 32 may be hereinafter referred to as an ejecting section D[m]. The variable m is a natural number satisfying "1≤m≤M". In addition, when a component, a signal, or the like of the ink jet printer 1 corresponds to the ejecting section D[m] among the number M of ejecting sections D, an index [m] may be added to a reference sign representing the component, the signal, or the like.

The supply circuit 31 switches, based on the print signal SI, whether to supply a drive signal Com to the ejecting section D[m]. The drive signal Com to be supplied to the ejecting section D[m] among drive signals Com may be hereinafter referred to as a supply drive signal Vin[m]. In addition, the supply circuit 31 switches, based on the print signal SI, whether to supply a detection potential signal VX[m] indicating a potential of an upper electrode Zu[m] of a piezoelectric element PZ[m] included in the ejecting section D[m] to the detecting circuit 33.

When the detection potential signal VX[m] is to be supplied from the ejecting section D[m] to the detecting circuit 33, the ejecting section D[m] may be hereinafter referred to as a determination target ejecting section DS.

The piezoelectric element PZ[m] and the upper electrode Zu[m] are described later with reference to FIG. 3.

The detecting circuit 33 generates a detection signal SK[m] based on the detection potential signal VX[m] supplied from the determination target ejecting section DS through the supply circuit 31. Specifically, the detecting circuit 33 generates the detection signal SK[m] by, for example, amplifying the detection potential signal VX[m] and removing a noise component from the detection potential signal VX[m].

The temperature detector 5 detects the temperature of the head unit 3 including the ejecting section D. In addition, the temperature detector 5 generates a temperature detection signal TI indicating the detected temperature and supplies the generated temperature detection signal TI to the control unit 2.

The determining unit 8 determines, based on the detection signal SK[m], whether an ink ejection state of the ejecting section D[m] is normal or whether the ejecting section D[m] is in a normal ejection state in which an ejection abnormality does not occur. The determining unit 8 generates ejection state determination information JH[m] indicating a result of the determination. The ejection abnormality means that the ink ejection state of the ejecting section D[m] is abnormal. That is, the ejection abnormality is a general term for a state in which the ejecting section D[m] cannot appropriately eject the ink from a nozzle N included in the ejecting section D[m]. For example, the ejection abnormality includes a state in which the ink cannot be ejected from the ejecting section D[m], a state in which the ejecting section D[m] ejects the ink in an amount different from an ink ejection amount defined by the drive signal Com, and a state in which the ejecting section D[m] ejects the ink at a speed different from an ink ejection speed defined by the drive signal Com. Processing relating to the determination of the ink ejection state of the ejecting section D[m] may be hereinafter referred to as ejection state determination processing. That is, the determination target ejecting section DS is the ejecting section D[m] to be subjected to the ejection state determination processing.

When the print processing is performed, the control unit 2 generates, based on the print data Img, a signal for controlling the head unit 3, such as the print signal SI. In addition, when the print processing is performed, the control unit 2 generates a signal for controlling the drive signal generating unit 4, such as the waveform specifying signal dCom. Furthermore, when the print processing is performed, the control unit 2 generates a signal for controlling the transport unit 7. As a result of the generation of the signals, in the print processing, the control unit 2 controls the transport unit 7 to change a relative position of the recording sheet P to the head unit 3, controls whether the ejecting section D[m] ejects the ink, an amount of the ink to be ejected, a timing of ejecting the ink, and the like, and controls the components of the ink jet printer 1 in such a way that the image corresponding to the print data Img is formed on the recording sheet P.

when the ejection state determination processing is performed, the control unit 2 generates the print signal SI specifying that the ejecting section D[m] is driven as the determination target ejecting section DS, and supplies the generated print signal SI to the supply circuit 31. In this case, the print signal SI specifies that the detection potential signal VX[m] is supplied to the detecting circuit 33 from the ejecting section D[m]. Thereafter, in the ejection state determination processing, the detecting unit 33 generates the detection signal SK[m] based on the detection potential signal VX[m] supplied through the supply circuit 31 from the ejecting section D[m] driven as the determination target ejecting section DS. Thereafter, in the ejection state determination processing, the determination unit 8 generates the ejection state determination information JH[m] based on the detection signal SK[m] supplied from the detecting circuit 33.

Figure 2:
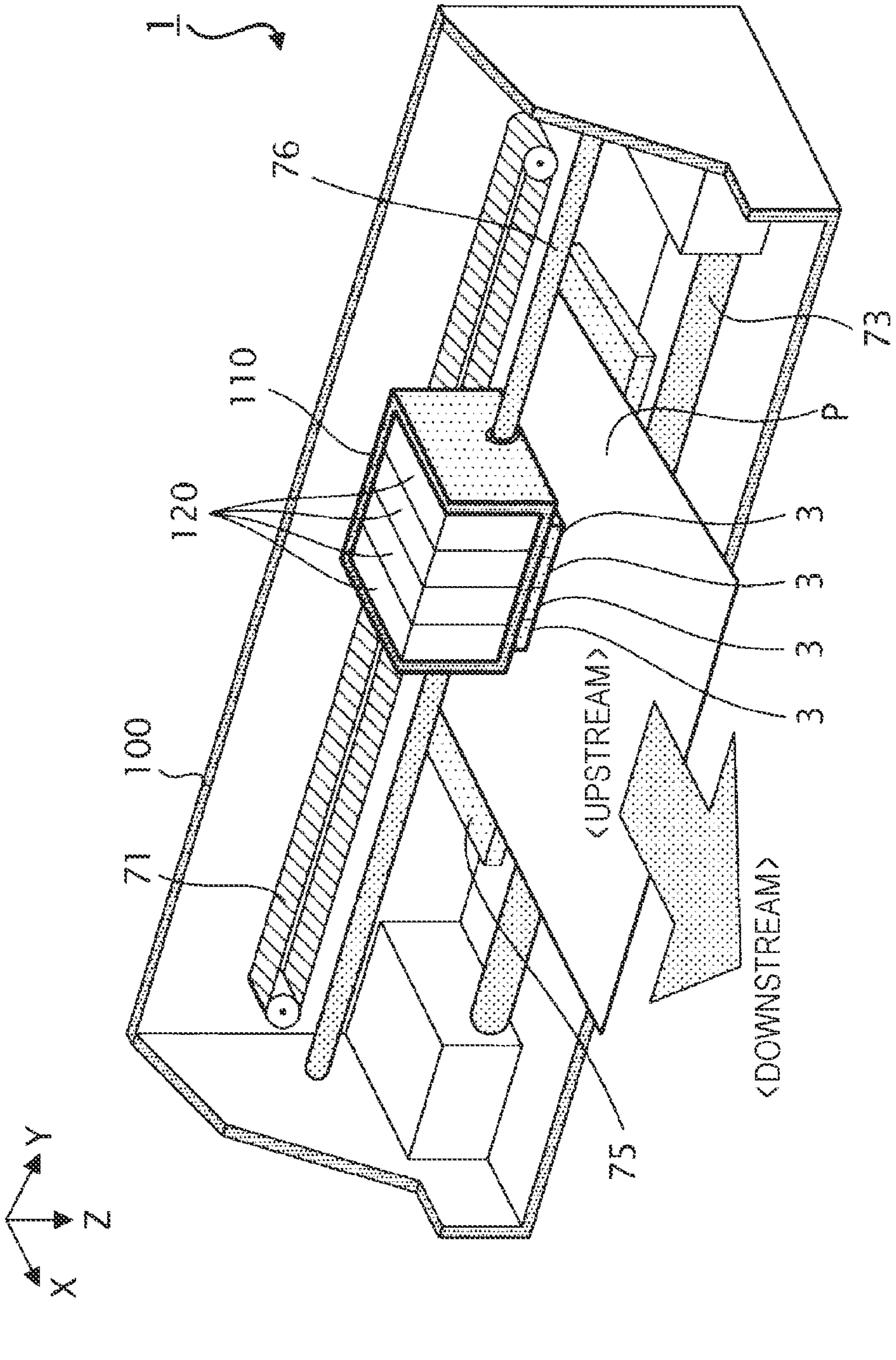
FIG. 2 is a perspective view of an example of a schematic internal structure of the ink jet printer.

FIG. 2 is a perspective view of an example of a schematic internal structure of the ink jet printer 1.

As illustrated in FIG. 2, in the present embodiment, it is assumed that the ink jet printer 1 is a serial printer. Specifically, in the print processing, the ink jet printer 1 ejects the ink from the ejecting section [Dm] to form a dot according to the print data Img while transporting the recording sheet P in a sub-scanning direction and moving the head unit 3 in main-scanning directions intersecting the sub-scanning direction.

Hereinafter, a +X direction and a —X direction opposite to the +X direction are collectively referred to as an "X-axis direction", a +Y direction intersecting the X-axis direction and a −Y direction opposite to the +Y direction are collectively referred to as a "Y-axis direction", and a +Z direction intersecting the X-axis direction and the Y-axis direction and a −Z direction opposite to the +Z direction are collectively referred to as a "Z-axis direction". In the present embodiment, as illustrated in FIG. 2, a direction from the −X side of the ink jet printer 1 that is upstream of the ink jet printer 1 to the +X side of the ink jet printer 1 that is downstream of the ink jet printer 1 corresponds to the sub-scanning direction, whereas the +Y direction and the −Y direction correspond to the main-scanning directions. In the present embodiment, as illustrated in FIG. 2, the +Z direction corresponds to a direction in which the ink is ejected from the ejecting section D[m].

As illustrated in FIG. 2, the ink jet printer 1 according to the present embodiment includes a housing 100 and a carriage 110 on which the one or more head units 3 are mounted and that is movable in the +Y direction and the −Y direction.

In the present embodiment, as illustrated in FIG. 2, the carriage 110 may store four ink cartridges 120 corresponding to ink of four colors, cyan, magenta, yellow, and black on a one-to-one basis. In the present embodiment, as an example, it is assumed that the ink jet printer 1 includes four head units 3 corresponding to the four ink cartridges 120 on a one-to-one basis. Ejecting sections D[m] are supplied with the ink from the ink cartridges 120 corresponding to the head units 3 including the ejecting sections D[m]. As a result, the ejecting sections D[m] are filled with the supplied ink and can eject the ink through nozzles N. The ink cartridges 120 may be disposed outside the carriage 110. The nozzles N are described with reference to FIG. 3.

In addition, as described above, the ink jet printer 1 according to the present embodiment includes the transport unit 7. As illustrated in FIG. 2, the transport unit 7 includes a carriage transport mechanism 71 that moves the carriage 110 in the +Y direction and the −Y direction, a carriage guide shaft 76 that supports the carriage 110 in such a way that the carriage 110 is movable in the +Y direction and the −Y direction, a medium transport mechanism 73 that transports the recording sheet P, and a platen 75 disposed on the +Z side of the carriage 110. Therefore, when the print processing is performed, the transport unit 7 causes the carriage transport mechanism 71 to move the head units 3 and the carriage 110 along the carriage guide shaft 76 in the +Y direction and the −Y direction, and causes the medium transport mechanism 73 to transport the recording sheet P on the platen 75 in the +X direction, thereby changing a relative position of the recording sheet P to the head units 3 and enabling the ink to land on an entire surface of the recording sheet P.

Figure 3:
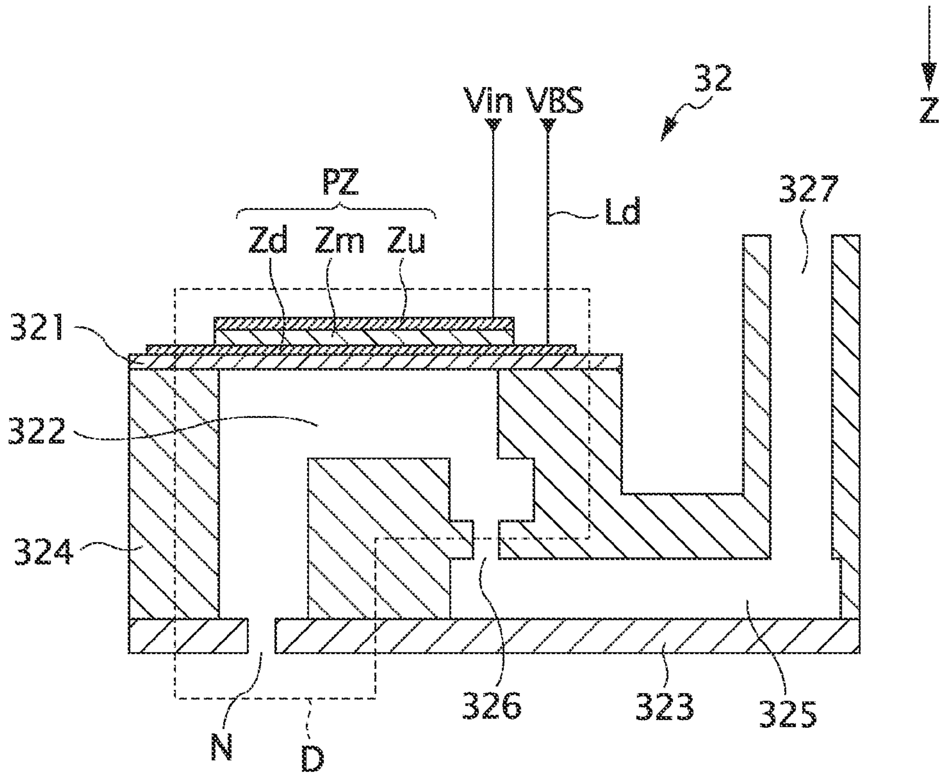
FIG. 3 is a cross-sectional view illustrating an example of a structure of an ejecting section.

FIG. 3 is a schematic partial cross-sectional view of a structure of the recording head 32, illustrating the ejecting section D[m] included in the recording head 32.

As illustrated in FIG. 3, the ejecting section D[m] includes the piezoelectric element PZ[m], a cavity 322 filled with the ink, the nozzle N communicating with the cavity 322, and a vibration plate 321. When the piezoelectric element PZ[m] is driven with the supply drive signal Vin [m], the ejecting section D[m] ejects the ink within the cavity 322 from the nozzle N. The cavity 322 is a space defined by a cavity plate 324, a nozzle plate 323 in which the nozzle N is formed, and the vibration plate 321. The cavity 322 communicates with a reservoir 325 via an ink outlet 326. The reservoir 325 communicates with the ink cartridge 120 corresponding to the ejecting section D[m] via an ink inlet 327. The piezoelectric element PZ[m] includes the upper electrode Zu[m], a lower electrode Zd[m], and a piezoelectric body Zm[m] disposed between the upper electrode Zu[m] and the lower electrode Zd[m]. The lower electrode Zd[m] is electrically coupled to a feeder line Ld set at a potential VBS. When the supply drive signal Vin[m] is supplied to the upper electrode Zu[m] and a voltage is applied between the upper electrode Zu[m] and the lower electrode Zd[m], the piezoelectric element PZ[m] deforms in the +Z direction or the −Z direction according to the applied voltage. As a result, the piezoelectric element PZ[m] vibrates. The vibration plate 321 is bonded to the lower electrode Zd[m]. Therefore, when the piezoelectric element PZ[m] is driven with the supply drive signal Vin[m] and vibrates, the vibration plate 321 also vibrates. The vibration of the vibration plate 321 alters the capacity of the cavity 322 and pressure within the cavity 322 to eject the ink within the cavity 322 from the nozzle N.

Figure 4:
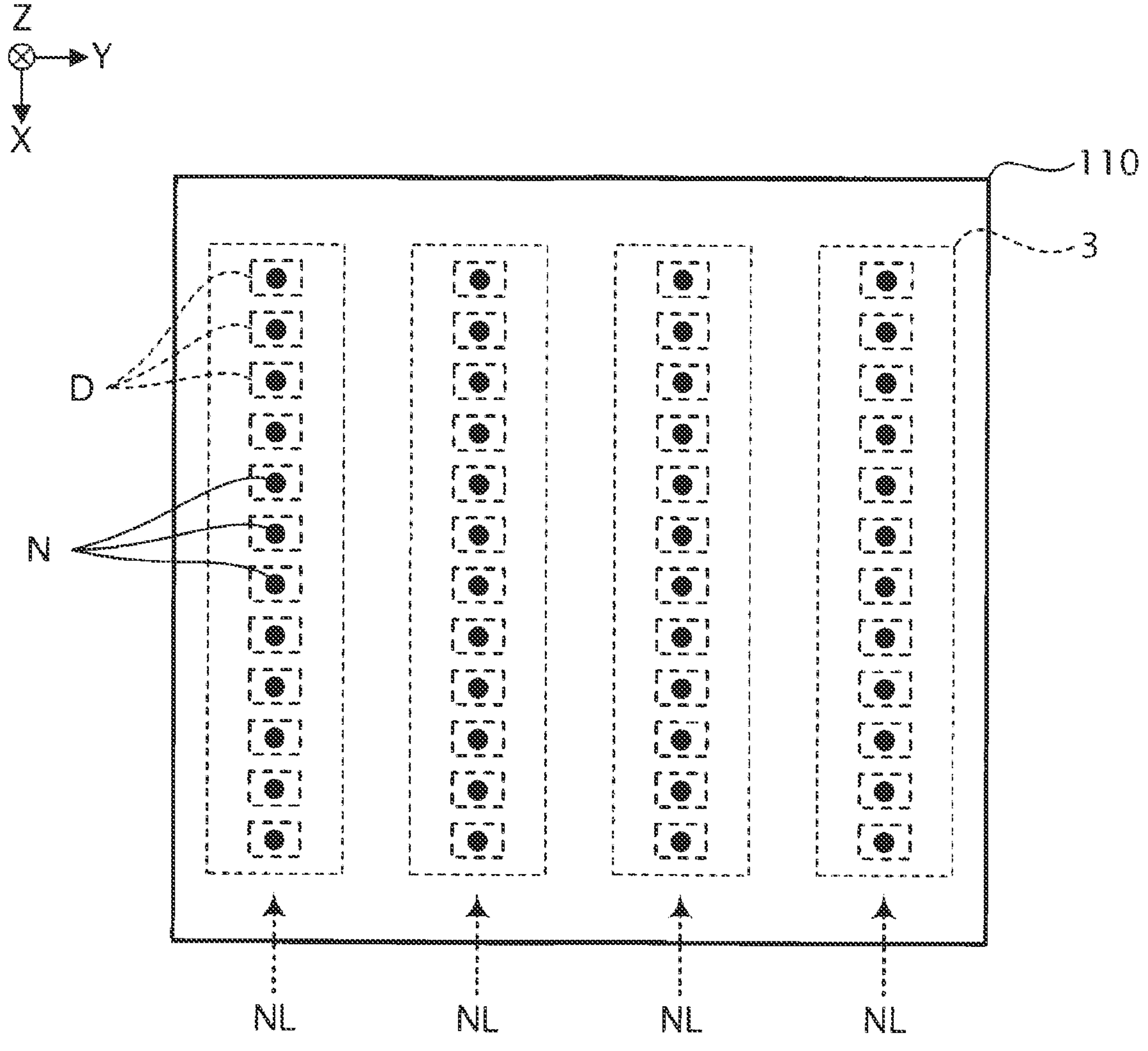
FIG. 4 is a plan view illustrating an example of arrangement of nozzles in a head unit.

FIG. 4 is an explanatory diagram illustrating an example of arrangement of the four head units 3 mounted on the carriage 110 and a number 4M of nozzles N included in the four head units 3 mounted on the carriage 110 of the ink jet printer 1 as viewed from the +Z direction.

As illustrated in FIG. 4, each of the head units 3 mounted on the carriage 110 includes a nozzle array NL. Each of the nozzle arrays NL is a plurality of nozzles N arranged in a line extending in a predetermined direction. In the present embodiment, each of the nozzle arrays NL may include a number M of nozzles N extending in the X-axis direction.

1-2. Configuration of Each Head Unit

A configuration of each of the head units 3 is described below with reference to FIG. 5.

Figure 5:
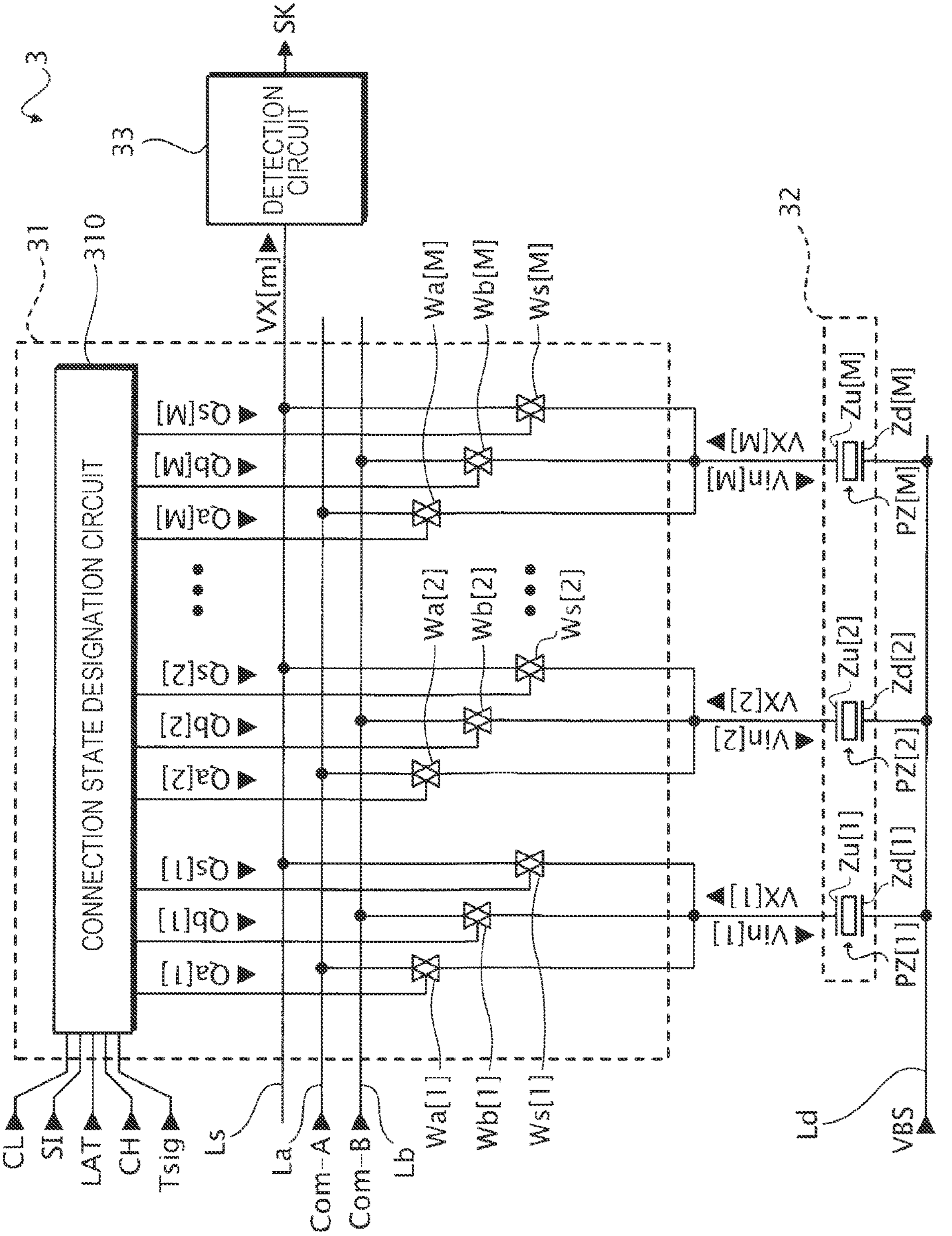
FIG. 5 is a block diagram illustrating an example of a configuration of the head unit.

FIG. 5 is a block diagram illustrating an example of the configuration of the head unit 3.

As illustrated in FIG. 5, the head unit 3 includes the supply circuit 31, the recording head 32, and the detecting circuit 33. The head unit 3 further includes a wire line La to which the drive signal Com-A is supplied from the drive signal generating unit 4, a wire line Lb to which the drive signal Com-B is supplied from the drive signal generating unit 4, and a wire line Ls from which the detection potential signal VX[m] is supplied to the detecting circuit 33.

As illustrated in FIG. 5, the supply circuit 31 includes a number M of switches Wa[1] to Wa[M] corresponding to the number M of ejecting sections D[1] to D[M] on a one-to-one basis, a number M of switches Wb[1] to Wb[M] corresponding to the number M of ejecting sections D[1] to D[M] on a one-to-one basis, a number M of switches Ws[1] to Ws[M] corresponding to the number M of ejecting sections D[1] to D[M] on a one-to-one basis, and a coupling state specifying circuit 310 that specifies a coupling state of each of the switches.

The coupling state specifying circuit 310 generates, based on at least one of the print signal SI, a latch signal LAT, a time period specifying signal Tsig, and a change signal CH supplied from the control unit 2, a first coupling state specifying signal Qa[m] specifying turning on or off of the switch Wa[m], a second coupling state specifying signal Qb[m] specifying turning on or off of the switch Wb[m], and a third coupling state specifying signal Qs[m] specifying turning on or off of the switch Ws[m].

The switch Wa[m] switches, based on the first coupling state specifying signal Qa[m], whether to set the wire line La to be electrically conductive to the upper electrode Zu[m] of the piezoelectric element PZ[m] disposed in the ejecting section D[m]. In the present embodiment, the switch Wa[m] is on when the first coupling state specifying signal Qa[m] is at a high level. In the present embodiment, the switch Wa[m] is off when the first coupling state specifying signal Qa[m] is at a low level. When the switch Wa[m] is on, the drive signal Com-A supplied to the wire line La is supplied as the supply drive signal Vin[m] to the upper electrode Zu[m] of the ejecting section D[m].

In addition, the switch Wb[m] switches, based on the second coupling state specifying signal Qb[m], whether to set the wire line Lb to be electrically conductive to the upper electrode Zu[m] of the piezoelectric element PZ[m] disposed in the ejecting section D[m]. In the present embodiment, the switch Wb[m] is on when the second coupling state specifying signal Qb[m] is at a high level. In the present embodiment, the switch Wb[m] is off when the second coupling state specifying signal Qb[m] is at a low level. When the switch Wb[m] is on, the drive signal Com-B supplied to the wire line Lb is supplied as the supply drive signal Vm[m] to the upper electrode Zu[m] of the ejecting section D[m].

In addition, the switch Ws[m] switches, based on the third coupling state specifying signal Qs[m], switches whether to set the wire line Ls to be electrically conductive to the upper electrode Zu[m] of the piezoelectric element PZ[m] disposed in the ejecting section D[m]. In the present embodiment, the switch Ws[m] is on when the third coupling state specifying signal Qs[m] is at a high level. In the present embodiment, the switch Ws[m] is off when the third coupling state specifying signal Qs[m] is at a low level. When the switch Ws[m] is on, the potential of the upper electrode Zu[m] of the ejecting section D[m] is supplied as the detection potential signal VX[m] to the detecting circuit 33 through the wire line Ls.

In addition, the detecting circuit 33 generates, based on the detection potential signal VX[m] supplied from the wire line Ls, the detection signal SK[m] having a waveform corresponding to the waveform of the detection potential signal VX[m].

1-3. Operation of Head Unit

An operation of the head unit 3 is described below with reference to FIGS. 6 and 7.

In the present embodiment, when the ink jet printer 1 performs the print processing or the ejection state determination processing, one or more unit time periods TP are set as an operation period of the ink jet printer 1. The ink jet printer 1 according to the present embodiment can drive each ejecting section D[m] for the print processing or the ejection state determination processing in each unit time period TP.

Figure 6:
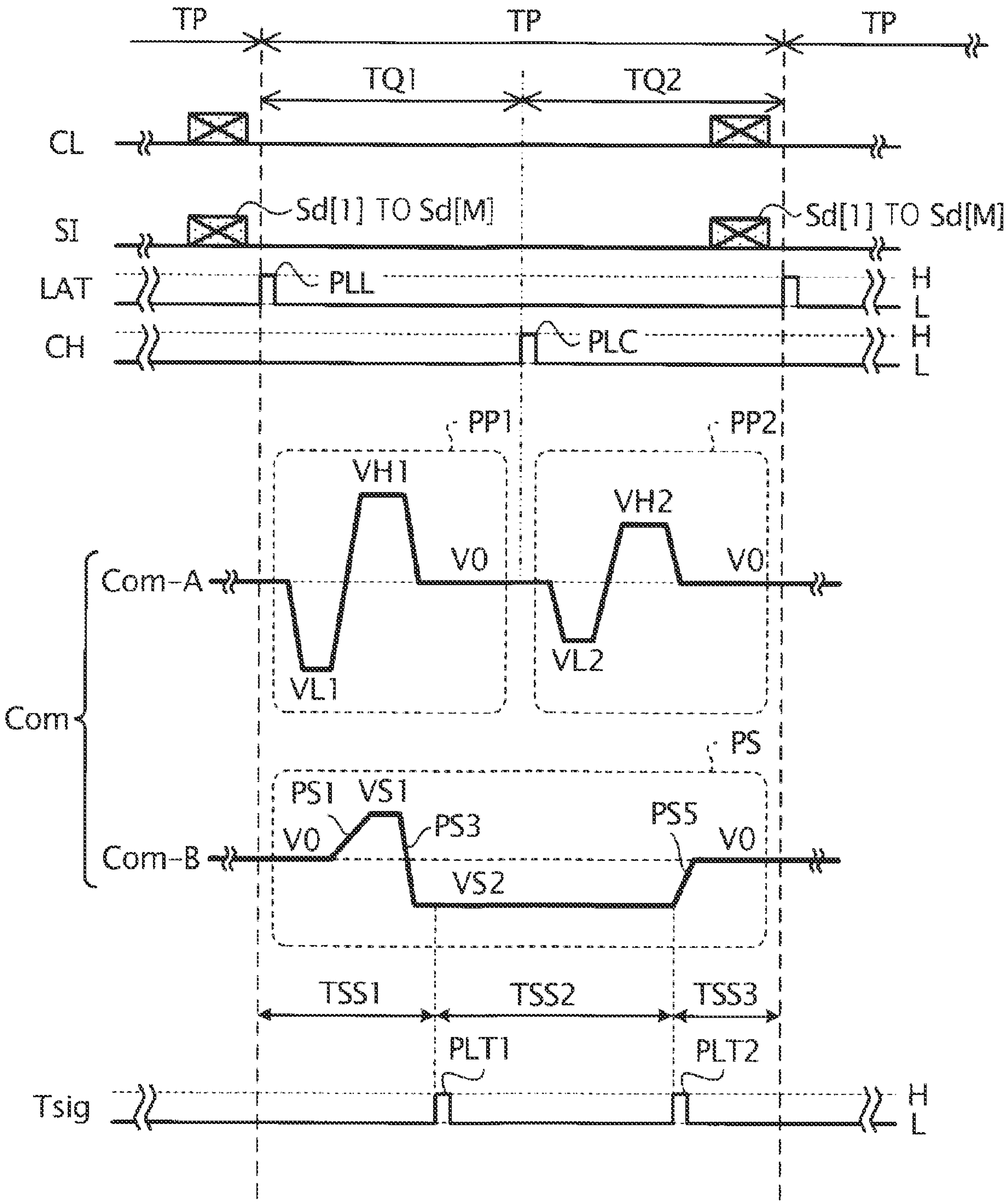
FIG. 6 is an example of a timing chart illustrating an operation in ejection state determination by the ink jet printer in a unit time period.

FIG. 6 is a timing chart illustrating an operation of the ink jet printer 1 in a unit time period TP.

As illustrated in FIG. 6, the control unit 2 outputs the latch signal LAT having a pulse PLL. The control unit 2 defines the unit time period TP as a time period from a rising edge of the pulse PLL to the next rising edge of the pulse PLL.

In addition, the control unit 2 outputs the change signal CH having a pulse PLC in the unit time period TP. Then, the control unit 2 divides the unit time period TP into a control period TQ1 from the rising edge of the pulse PLL to a rising edge of the pulse PLC and a control period TQ2 from the rising edge of the pulse PLC to the next rising edge of the pulse PLL.

Furthermore, the control unit 2 outputs the time period specifying signal Tsig having a pulse PLT1 and a pulse PLT2. Then, the control unit 2 divides the unit time period TP into a control period TSS1 from the rising edge of the pulse PLL to a rising edge of the pulse PLT1, a control period TSS2 from the rising edge of the pulse PLT1 to a rising edge of the pulse PLT2, and a control period TSS3 from the rising edge of the pulse PLT2 to the next rising edge of the pulse PLL.

The print signal SI according to the present embodiment includes a number M of individual specifying signals Sd[1] to Sd[M] corresponding to the number M of ejecting sections D[1] to D[M] on a one-to-one basis. In the print processing or the ejection state determination processing performed by the ink jet printer 1, the individual specifying signal Sd[m] specifies a mode of driving the ejecting section D[m] in each unit time period TP.

As illustrated in FIG. 6, before each unit time period TP, the control unit 2 synchronizes the print signal SI including the individual specifying signals Sd[1] to Sd[M] with the clock signal CL, and supplies the print signal SI including the individual specifying signals Sd[1] to Sd[M] to the coupling state specifying circuit 310. Then, the coupling state specifying circuit 310 generates, based on the individual specifying signal Sd[m], the first coupling state specifying signal Qa[m], the second coupling state specifying signal Qb[m], and the third coupling state specifying signal Qs[m] in the unit time period TP.

In the present embodiment, it is assumed that the ejecting section D[m] can form any one of a large dot, a middle dot smaller than the large dot, and a small dot smaller than the middle dot in the unit time period TP. In the present embodiment, it is assumed that the individual specifying signal Sd[m] can take any one of a value "1" specifying the ejecting section D[m] as a large dot formation ejecting section DP-1 that ejects ink in an amount corresponding to the large dot, a value "2" specifying the ejecting section D[m] as a middle dot formation ejecting section DP-2 that ejects ink in an amount corresponding to the middle dot, a value "3" specifying the ejecting section D[m] as a small dot formation ejecting section DP-3 that ejects ink in an amount corresponding to the small dot, a value "4" specifying the ejecting section D[m] as a non-dot formation ejecting section DP-4 that is a non-determination target ejecting section DS that does not eject ink, and a value "5" specifying the ejecting section D[m] as the determination target ejecting section DS.

As illustrated in FIG. 6, in the present embodiment, the drive signal Com-A includes a waveform PP1 in the control period TQ1 and a waveform PP2 in the control period TQ2. The waveform PP1 represents a potential that changes from a reference potential V0 to a potential VL1 lower than the reference potential V0 to a potential VH1 higher than the reference potential V0 and returns to the reference potential V0. The waveform PP1 is defined in such a way that when the supply drive signal Vin[m] having the waveform PP1 is supplied to the ejecting section D[m], an amount ξ1 of ink is ejected from the ejecting section D[m]. The waveform PP2 represents a potential that changes from the reference voltage V0 to a potential VL2 lower than the reference potential V0 to a potential VH2 higher than the reference potential V0 and returns to the reference potential V0. The waveform PP2 is defined in such a way that when the supply drive signal Vin[m] having the waveform PP2 is supplied to the ejecting section D[m], an amount ξ2 of ink is ejected from the ejecting section D[m].

In the present embodiment, the amount ξ1 of ink corresponds to the middle dot. In the present embodiment, the amount ξ2 of ink is smaller than the amount ξ1 of ink and corresponds to the small dot. In the present embodiment, the total of the amount ξ1 of ink and the amount ξ2 of ink is an amount of ink corresponding to the large dot.

In the present embodiment, as an example, it is assumed that the potential of the supply drive signal Vin[m] supplied to the ejecting section D[m] is at a high level, the capacity of the cavity 322 included in the ejecting section D[m] decreases, as compared with a case where the potential of the supply drive signal Vin[m] is at a low level. Therefore, when the ejecting section D[m] is driven with the supply drive signal Vin[m] having the waveform PP1 or the waveform PP2, the potential of the supply drive signal Vin[m] changes from the low level to the high level and thus the ink within the ejecting section D[m] is ejected from the nozzle N.

As illustrated in FIG. 6, in the present embodiment, the drive signal Com-B includes a waveform PS in the unit time period TP. The waveform PS represents a potential that changes from the reference potential V0 to a potential VS1 higher than the reference potential V0 to a potential VS2 lower than the reference potential V0 and is maintained at the potential VS2 in the control period TSS1. In addition, the waveform PS represents the potential VS2 maintained in the control period TSS2. Furthermore, the waveform PS represents a potential that changes from the potential VS2 to the reference potential V0 and is maintained at the reference potential V0 in the control period TSS3. A direction in which the potential changes from the reference potential V0 to the potential VS1 is opposite to a direction in which the potential changes from the potential VS1 to the potential VS2. The reference potential V0 is an example of a "first potential". The potential VS1 is an example of a "second potential". The potential VS2 is an example of a "third potential". In the present disclosure, "a single signal is maintained at a single potential in a single time period" means that "the single signal is maintained at a potential matching the single potential in the single time period", "the single signal is maintained at the potential matching the single potential in the single time period in design", and "the single signal can be regarded to be maintained at the potential matching the single potential in the single time period when noise is removed from the single signal".

As described later with reference to FIG. 8, a portion of the waveform PS that represents a potential that changes from the reference potential V0 to the potential VS1 is referred to as a waveform PS1. The waveform PS1 is an example of a "first potential-changing element". In addition, a portion of the waveform PS that represents the potential VS1 maintained is referred to as a waveform PS2. The waveform PS2 is an example of a "first potential-maintaining element". Furthermore, a portion of the waveform PS that represents a potential that changes from the potential VS1 to the potential VS2 is referred to as a waveform PS3. The waveform PS3 is an example of a "second potential-changing element". Furthermore, a portion of the waveform PS that represents the potential VS2 maintained is referred to as a waveform PS4. The waveform PS4 is an example of a "second potential-maintaining element". Furthermore, a portion of the waveform PS that represents a potential that changes from the potential VS2 to the reference potential V0 is referred to as a waveform PS5. In the present embodiment, the waveform PS1 and the waveform PS5 are provided to deform the piezoelectric element PZ[m] in the +Z direction, and the waveform PS3 is provided to deform the piezoelectric element PZ[m] in the −Z direction.

As described later with reference to FIG. 8, a time period that is within the unit time period TP and in which the waveform PS1 is provided is referred to as a time period TPS1. The time period TPS1 is an example of a "first time period". A time period that is within the unit time period TP and in which the waveform PS2 is provided is referred to as a time period TPS2. The time period TPS2 is an example of a "second time period". A time period that is within the unit time period TP and in which the waveform PS3 is provided is referred to as a time period TPS3. The time period TPS3 is an example of a "third time period". A time period that is within the time period TP and in which the waveform PS4 is provided is referred to as a time period TPS4. The time period TPS4 is an example of a "fourth time period". A time period that is within the unit time period TP and in which the waveform PS5 is provided is referred to as a time period TPS5. The time period TPS5 is an example of a "fifth time period".

Figure 8:
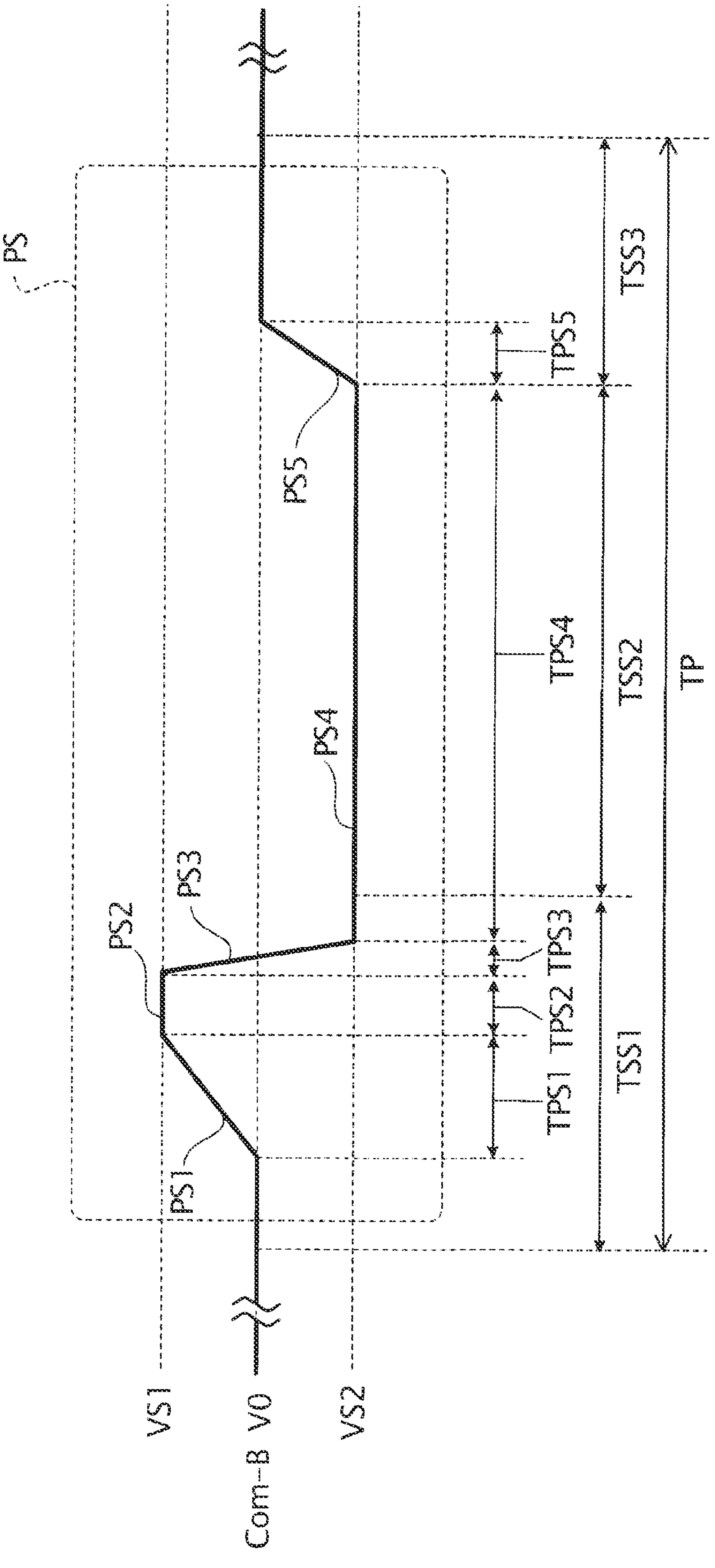
FIG. 8 is an example of a timing chart illustrating a drive signal in the unit time period.

In the example illustrated in FIG. 8, the reference potential V0 is between the potential VS1 and the potential VS2. In the example illustrated in FIG. 8, the potential of the drive signal Com-B temporarily changes from the reference potential V0 to the potential VS1 higher than the reference potential V0 in the time period TPS1 and changes from the potential VS1 to the potential VS2 lower than the reference potential V0 in the time period TPS3 after the time period TPS1. As a result of the change in the potential, the piezoelectric element PZ[m] included in the ejecting section D[m] can be largely deformed. In the example illustrated in FIG. 8, the potential VS1 is higher than the reference potential V0, and the potential VS2 is lower than the reference potential V0. However, the potential VS1 may be lower than the reference potential V0, and the potential VS2 may be higher than the reference potential V0.

In the present embodiment, as an example, it is assumed that the waveform PS is defined in such a way that when the supply drive signal Vin[m] having the waveform PS is supplied to the ejecting section D[m], the ink is not ejected from the ejecting section D[m].

FIG. 7 is an explanatory diagram illustrating a relationship between the individual specifying signal Sd[m], the first coupling state specifying signal Qa[m], the second coupling state specifying signal Qb[m], and the third coupling state specifying signal Qs[m] in the unit time period TP.

As illustrated in FIG. 7, when the individual specifying signal Sd[m] indicates the value "1" specifying the ejecting section D[m] as the large dot formation ejecting section DP-1 in the unit time period TP, the coupling state specifying circuit 310 sets the first coupling state specifying signal Qa[m] to a high level for the control period TQ1 and the control period TQ2. In this case, the switch Wa[m] is on for the unit time period TP. Therefore, the ejecting section D[m] is driven with the supply drive signal Vin[m] having the waveform PP1 and the waveform PP2 and ejects the ink in the amount corresponding to the large dot in the unit time period TP.

In addition, when the individual specifying signal Sd[m] indicates the value "2" specifying the ejecting section D[m] as the middle dot formation ejecting section DP-2 in the time period TP, the coupling state specifying circuit 310 sets the first coupling state specifying signal Qa[m] to a high level for the control period TQ1. In this case, the switch Wa[m] is on for the control period TQ1. Therefore, the ejecting section D[m] is driven with the supply drive signal Vin[m] having the waveform PP1 and ejects the ink in the amount corresponding to the middle dot in the unit time period TP.

When the individual specifying signal Sd[m] indicates the value "3" specifying the ejecting section D[m] as the small dot formation ejecting section DP-3 in the unit time period TP, the coupling state specifying circuit 310 sets the first coupling state specifying signal Qa[m] to a high level for the control period TQ2. In this case, the switch Wa[m] is on for the control period TQ2. Therefore, the ejecting section D[m] is driven with the supply drive signal Vin[m] having the waveform PP2 and ejects the ink in the amount corresponding to the small dot in the unit time period TP.

When the individual specifying signal Sd[m] indicates the value "4" specifying the ejecting section D[m] as the non-dot formation ejecting section DP-4 in the unit time period TP, the coupling state specifying circuit 310 sets the first coupling state specifying signal Qa[m], the second coupling state specifying signal Qb[m], and the third coupling state specifying signal Qs[m] to a low level for the unit time period TP. In this case, the switch Wa[m], the switch Wb[m], and the switch Ws[m] are off for the unit time period TP. Therefore, for the unit time period TP, the supply drive signal Vin[m] is not supplied to the ejecting section D[m] and the ink is not ejected from the ejecting section D[m].

When the individual specifying signal Sd[m] indicates the value "5" specifying the ejecting section D[m] as the determination target ejecting section DS in the unit time period TP, the coupling state specifying circuit 310 sets the second coupling state specifying signal Qb[m] to a high level for the control period TSS1 and the control period TSS3 and sets the third coupling state specifying signal Qb[m] to a high level in the control period TSS2. In this case, the switch Wb[m] is on for the control period TSS1 and the control period TSS3, and the switch Ws[m] is on for the control period TSS2. Therefore, when a vibration occurs in the ejecting section D[m] as a result of the driving of the ejecting section D[m] specified as the determination target ejecting section DS with the supply drive signal Vin[m] having the waveform PS1 and the waveform PS3 in the control period TSS1, the vibration remains in the control period TSS2. In the control period TSS2, when the vibration remains in the ejecting section D[m], the potential of the upper electrode Zu[m] included in the ejecting section D[m] changes. Then, in the control period TSS2, when the vibration remains in the ejecting section D[m], the potential of the upper electrode Zu[m] is supplied as the detection potential signal VX[m] to the detecting circuit 33 through the switch Ws[m].

That is, the waveform of the detection potential signal VX[m] detected from the ejecting section D[m] in the control period TSS2 indicates the waveform of the vibration remaining in the ejecting section D[m] in the control period TSS2. Then, the waveform of the detection signal SK[m] generated based on the detection potential signal VX[m] detected from the ejecting section D[m] in the control period TSS2 indicates the waveform of the vibration remaining in the ejecting section D[m] in the control period TSS2. The detecting circuit 33 detects the vibration remaining in the ejecting section D[m] in a detection period included in the time period TPS4 within the control period TSS2. The detecting circuit 33 is an example of a "vibration detector".

The determining unit 8 determines, based on characteristics such as the amplitude, the period, and the like of the residual vibration indicated by the detection signal SK[m] supplied from the detecting circuit 33, whether the ink ejection state of the ejecting section D[m] is normal. Then, the determining unit 8 generates the ejection state determination information JH[m] indicating a result of determining the ink ejection state.

1-4. Details of Drive Signal Com-B

Details of the drive signal Com-B are described below with reference to FIG. 8. FIG. 8 is an example of a timing chart illustrating the drive signal Com-B in the unit time period TP. The drive signal Com-B is an example of an "inspection signal".

In the present embodiment, the time period TPS1 from the start of the waveform PS1 included in the drive signal Com-B to the end of the waveform PS1 included in the drive signal Com-B is determined based on a natural vibration period TC of the ejecting section D. In the present embodiment, as an example, it is assumed that the natural vibration period TC is an average value of natural vibration periods of the number M of ejecting sections D[1] to D[M] included in the recording head 32. The natural vibration period of the ejecting section D[m] among the natural vibration periods of the number M of ejecting sections D[1] to D[M] is a period of a residual vibration detected from the ejecting section D[m] driven with the drive signal Com-B or the like when the ink ejection state of the ejecting section D[m] is normal. For example, the natural vibration period of the ejecting section D[m] may be a period of a residual vibration detected from the ejecting section D[m] driven with the drive signal Com-B or the like in the ejection state determination processing performed in quality inspection before shipment of the ink jet printer 1.

However, the present disclosure is not limited thereto. For example, as the natural vibration period of the ejecting section D, an average value of natural vibration periods of a plurality of ejecting sections D included in a plurality of ink jet printers 1 may be used.

In addition, for example, the natural vibration period TC of the ejecting section D may be determined based on an average value of usage periods of the number M of ejecting sections D[1] to D[M] that is indicated by characteristic information relating to the characteristics of the piezoelectric element PZ[m]. In this case, the natural vibration period TC of the ejecting section D may be determined based on information stored in a storage device (not illustrated) and indicating a relationship between the usage period of the ejecting section D and the natural vibration period of the ejecting section D. Examples of the characteristic information relating to the characteristics of the piezoelectric element PZ[m] are a cumulative energization time that is a cumulative time when a drive signal Com is supplied to the head unit 3 in a predetermined time period from shipment of the ink jet printer 1 as a product to the current time, and the number of supplied pulses of the drive signal Com. The longer the cumulative energization time as the characteristic information, the longer the usage period of the ejecting section D. In addition, the larger the number of supplied pulses of the drive signal Com as the characteristic information, the longer the usage period of the ejecting section D. As an example, the control unit 2 calculates the cumulative energization time by multiplying the length of the unit time period TP by the counted number of pulses PLL of the latch signal LAT. As an example, the control unit 2 counts the number of supplied pulses of the drive signal Com-A based on the print signal SI. The control unit 2 acquires the cumulative energization time or the number of supplied pulses of the drive signal Com as the characteristic information relating to the characteristics of the piezoelectric element PZ[m]. The control unit 2 is an example of an "acquirer".

For example, a natural vibration period of any one of the number M of ejecting sections D[1] to D[M] may be used as the natural vibration period TC of the ejecting section D. The natural vibration period TC may be hereinafter merely referred to as "TC".

In FIG. 8, the length of the time period TPS1 is equal to or longer than 0.75×TC. When a number N is a natural number of 1 or more, the length of the time period TPS1 is preferably equal to or longer than 0.75×N×TC and equal to or shorter than 1.25×N×TC. In this case, the number N is more preferably 1 or 2. In addition, the length of the time period TPS1 is more preferably an integer multiple of the length of the natural vibration period TC.

In an existing technique, in ejection state determination processing of determining an ink ejection state of an ejecting section D[m], to detect a residual vibration occurring in the ejecting section D[m], a drive signal Com-B is supplied to a piezoelectric element PZ[m included in the ejecting section D[m] to deform the piezoelectric element PZ[m] before the detection of the residual vibration as described above. When the deformation of the piezoelectric element PZ[m] is large, it is possible to improve the accuracy of the determination in the ejection state determination processing based on the residual vibration occurring in the ejecting section D[m], as compared with a case where the deformation of the piezoelectric element PZ[m] is small. Therefore, in the existing technique, in the ejection state determination processing, to increase the deformation of the piezoelectric element PZ[m], the potential of the drive signal Com-B to be supplied to the ejecting section D[m] is changed from a reference voltage V0 to a certain voltage in one direction and is changed from the certain voltage in the other direction. In this case, in the ejection state determination processing, the ink ejection state of the ejecting section D[m] is determined based on the residual vibration in which a vibration occurring in the ejecting section D[m] due to the change in the potential of the drive signal Com-B in the one direction overlaps another vibration occurring in the ejecting section D[m] due to the change in the potential of the drive signal Com-B in the other direction. However, due to manufacturing variance in the ejecting section D[m] or the like, the characteristics of the residual vibration occurring in the ejecting section D[m] may vary.

Specifically, due to a manufacturing error occurring in the ejecting section D[m] or the like, an effect of one vibration occurring in the ejecting section D[m] due to a change in the potential of the drive signal Com-B to one side on another vibration occurring in the ejecting section D[m] due to a change in the potential of the drive signal Com-B to the other side varies. Due to the effect that varies, the characteristics of the residual vibration occurring in the ejecting section D[m] driven with the drive signal Com-B vary.

When the characteristics of the residual vibration occurring in the ejecting section D[m] largely vary, the accuracy of the determination in the ejection state determination processing decreases.

Particularly, when "vibration suppression" occurs in such a way that one vibration occurring in the ejecting section D[m] due to a change in the potential of the drive signal Com-B to one side and another vibration that occurring in the ejecting section D[m] due to a change in the potential of the drive signal Com-B to the other side cancel each other, the amplitude of the residual vibration detected in the ejection state determination processing is smaller, as compared with a case where the "vibration suppression" does not occur. Therefore, the accuracy of the ejection state determination processing performed based on the residual vibration decreases.

When "resonance" occurs in such a way that one vibration occurring in the ejecting section D[m] and another vibration occurring in the ejecting section D[m] strengthen each other, there may be a problem that a risk of erroneously ejecting ink from the ejecting section D[m] increases, as compared with a case where the "resonance" does not occur.

In the present embodiment, when the length of the time period TPS1 is set to a length of 0.75×TC or more, it is possible to suppress a vibration caused by the waveform PS1 in the ejecting section D[m] to which the drive signal Com-B is supplied, as compared with a case where the length of the time period TPS1 is set to a length of less than 0.75×TC. As a result, according to the present embodiment, an effect of a vibration caused by the waveform PS1 on a vibration caused by the waveform PS3 in the ejecting section D[m] to which the drive signal Com-B is supplied is suppressed, as compared with a case where the length of the time period TPS1 is set to a length of less than 0.75×TC. Therefore, the ink jet printer 1 according to the present embodiment can accurately determine the ejection state of the ejecting section D[m], as compared with a case where the length of the time period TPS1 is set to a length of less than 0.75×TC.

Figure 9:
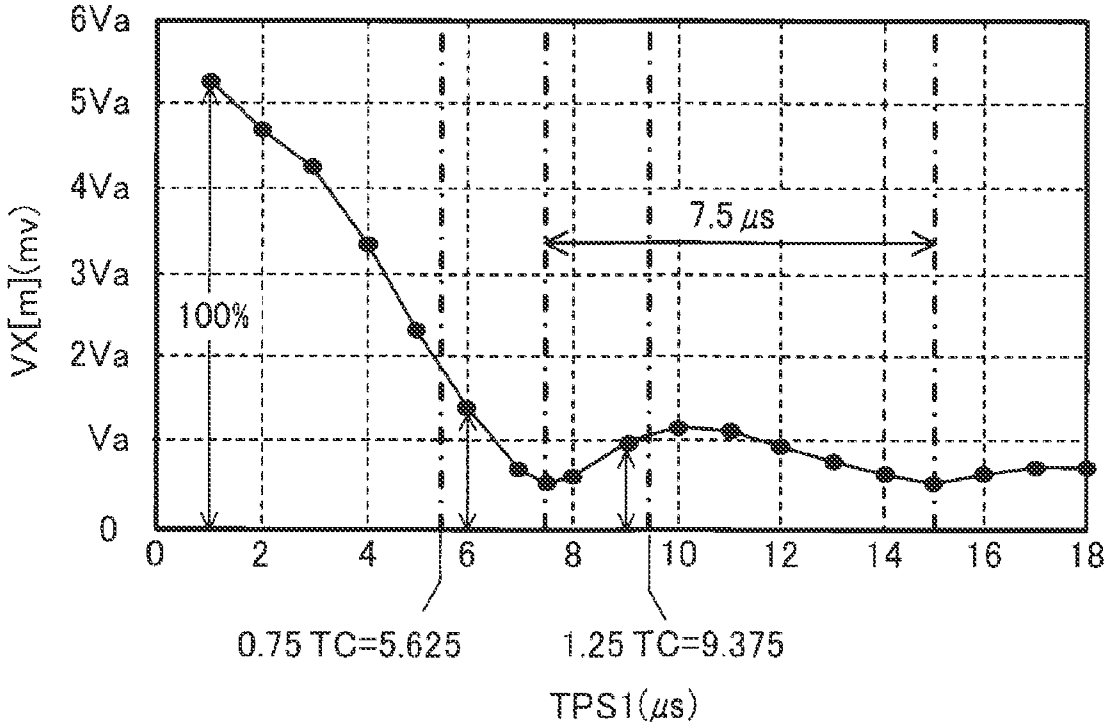
FIG. 9 is a diagram illustrating a relationship between a length of a time period in which a waveform is provided and an amplitude of a residual vibration detected from the ejecting section when the ejecting section is driven with the drive signal having the waveform.

FIG. 9 is a diagram illustrating a relationship between the length of the time period TPS1 in which the waveform PS is provided and the amplitude of a residual vibration detected from the ejecting section D[m] when the ejecting section D[m] is driven with the drive signal Com-B having the waveform PS1. Specifically, FIG. 9 is a graph plotting a relationship between the length of the time period TPS1 and the amplitude of the detection potential signal VX[m] obtained in an experiment in which, while the length of the time period TPS1 in which the waveform PS1 included in the drive signal Com-B is provided is changed, the drive signal Com-B is supplied to the ejecting section D[m] and the detection potential signal VX[m] is detected from the ejecting section D[m]. In the graph illustrated in FIG. 9, the horizontal axis represents the length of the time period TPS1 and the vertical axis represents the amplitude of the detection potential signal VX[m]. In FIG. 9, the natural vibration period TC=7.5 microseconds (μs).

In the graph illustrated in FIG. 9, as the value of the time period TPS1 increases from 1 μs to 7.51 μs, the amplitude of the detection potential signal VX[m] decreases. Particularly, the amplitude of the detection potential signal VX[m] in the case that the time period TPS1 is 6 μs which is more than 5.625 μs that is 0.75 times of TC is smaller than 30% of the amplitude of the detection potential signal VX[m] in the case that the time period TPS1 is 1 μs. In this case, a time period from the start of the time period TPS1 to the time point of 6 μs is longer than a time period from the start of the time period TPS1 to a time point of 5.625 μs=0.75×TC after the start of the time period TPS1. In other words, when the length of the time period TPS1 is equal to or longer than 0.75×TC, variance in the characteristics of a residual vibration caused by a change in the potential represented by the waveform PS1 to one side is significantly suppressed.

In the graph illustrated in FIG. 9, after the value of the amplitude of the detection potential signal VX[m] becomes a local minimum value at the time point of 7.5 μs after the start of the time period TPS1, the value of the amplitude of the detection potential signal VX[m] increases as the value of the time period TPS1 increases in a time period from the time point of 7.5 μs to a time point of 10 μs after the start of the time period TPS1. However, the amplitude of the detection potential signal VX[m] at a time point of 9 μs after the start of the time period TPS1 is maintained at a value smaller than 25% of the amplitude of the detection potential signal VX[m] at the time point of 1 μs after the time period TPS1. In this case, a time period from the start of the time period TPS1 to the time point of 9 μs is shorter than a time period from the start of the time period TPS1 to a time point of 9.375 μs=1.25×TC after the time period TPS1. Thereafter, in a time period from the time point of 10 μs to a time point of 15 μs after the start of the time period TPS1, as the value of the time period TPS1 increases, the value of the amplitude of the detection potential signal VX[m] decreases. The value of the amplitude of the detection potential signal VX[m] becomes a local minimum value again at the time point of 15 μs after the start of the time period TPS1. As illustrated in FIG. 9, every time the length of the time period TPS1 increases to a multiple of the natural vibration period TC=7.5 μs, the value of the amplitude of the detection potential signal VX[m] becomes a local minimum value.

Figure 10:
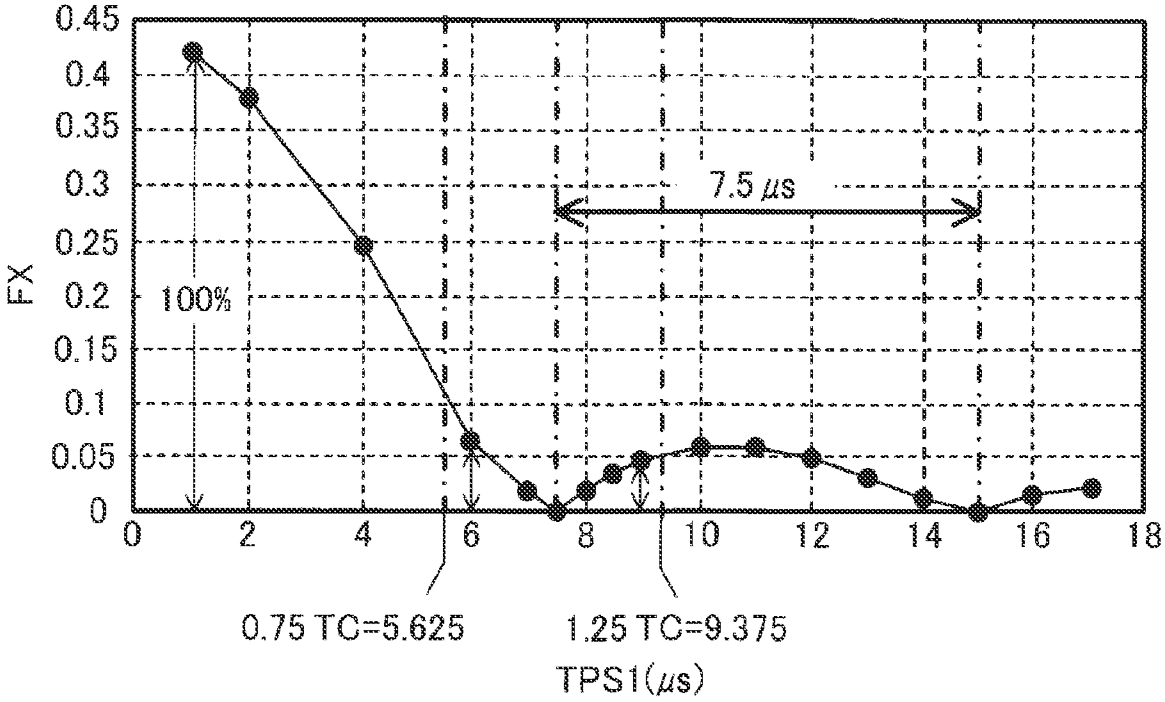
FIG. 10 is diagram illustrating a relationship between the length of the time period in which the waveform is provided and an amplitude of a synthesized vibration detected from the ejecting section when the ejecting section is driven with the drive signal having the waveform.

FIG. 10 is a diagram illustrating a relationship between the length of the time period TPS1 in which the waveform PS1 is provided and the amplitude of a synthesized vibration detected from the ejecting section D[m] when the ejecting section D[m] is driven with the drive signal Com-B having the waveform PS1. Specifically, FIG. 10 is a graph plotting a relationship between the length of the time period TPS1 and the amplitude of the detection potential signal VX[m] as results of calculation by simulation when the drive signal Com-B is supplied to the ejecting section D[m] and the detection potential signal VX[m] is detected from the ejecting section D[m] while the length of the time period TPS1 in which the waveform PS1 included in the drive signal Com-B is provided is changed. The graph illustrated in FIG. 10 is obtained when the waveform PS1 is regarded to be a repetition of small step-like waveforms and the amplitude of the synthesized vibration obtained by synthesizing vibrations caused by the waveforms is calculated. Specifically, when the amplitude of a vibration caused by an n-th step-like waveform is fn, the amplitude FX of the synthesized vibration is calculated according to the following Equation (1). In Equation (1), N is a sufficiently large real number.

$$FX = \sum_{n=1}^{N} f_n \tag{1}$$

When a unit time period Δt of each of the step-like waveforms is 0.05 μs, the amplitude fn of the vibration caused by the n-th step-like waveform is calculated according to the following Equation (2), where $t_1$ that is a start time of the n-th step-like waveform is Δt×n, A is a default value of the amplitude, and T is a time variable relating to the attenuation of the amplitude A.

$$f_n = A\sin\left(\frac{2\pi}{TC}(t - t_n)\right) \times e^{-\frac{t}{\tau}} \tag{2}$$

$A = \Delta t/\mathrm{TPS1}$. In Equation (2),

In the graph illustrated in FIG. 10, in a time period from the time point of 1 μs after the start of the time period TPS1 to the time point of 7.5 μs after the start of the time period TPS1, as the value of the time period TPS1 increases, the value of the amplitude FX of the synthesized vibration decreases. Particularly, the amplitude FX of the synthesized vibration at the time point of 6 μs after the start of the time period TPS1 is smaller than 20% of the amplitude FX of the synthesized vibration at the time point of 1 μs after the start of the time period TPS1. In this case, the time period from the start of the time period TPS1 to the time point of 6 μs is longer than the time period from the start of the time period TPS1 to the time point of 5.625 μs=0.75×TC after the start time of the time period TPS1. In other words, when the length of the time period TPS1 is equal to or longer than 0.75×TC, variance in the characteristics of a residual vibration caused by a change in the potential represented by the waveform PS1 to one side is significantly suppressed.

In the graph illustrated in FIG. 10, after the value of the amplitude of the synthesized vibration becomes a local minimum value at the time point of 7.5 us after the start of the time period TPS1, the value of the amplitude FX of the synthesized vibration increases as the value of the time period TPS1 increases in the time period from the time point of 7.5 μs to the time point of 10 μs after the start of the time period TPS1. However, the amplitude FX of the synthesized vibration at the time point of 9 μs after the start of the time period TPS1 is maintained at a value smaller than 25% of the amplitude FX of the synthesized vibration at the time point of 1 μs after the start of the time period TPS1. In this case, the time period from the start of the time period TPS1 to the time point of 9 μs is shorter than the time period from the start of the time period TPS1 to the time point of 9.375 μs=1.25×TC after the start of the time period TPS1. Thereafter, in a time period from the time point of 10 μs after the start of the time period TPS1 to the time point of 15 μs after the start of the time period TPS1, as the value of the time period TPS increases, the value of the amplitude FX of the synthesized vibration decreases. The value of the amplitude FX of the synthesized vibration becomes a local minimum value again at the time point of 15 μs after the start of the time period TPS1. As illustrated in FIG. 10, every time the time period TPS1 becomes a multiple of the natural vibration period TC=7.5 μs, the value of the amplitude FX of the synthesized vibration becomes a local minimum value.

The graphs illustrated in FIGS. 9 and 10 indicate that it is preferable that the length of the time period TPS1 be equal to or longer than 0.75×TC and equal to or shorter than 1.25×TC. However, the length of the time period TPS1 may be equal to or longer than 0.75×2×TC and equal to or shorter than 1.25×2×TC. Alternatively, when the number N is a natural number, the length of the time period TPS1 may be equal to or longer than 0.75×N×TC and equal to or shorter than 1.25×N×TC.

In FIG. 8, the length of the time period TPS2 is preferably equal to or longer than the length of the natural vibration period TC. When the length of the time period TPS2 is equal to or longer than the length of the natural vibration period TC, variance in the characteristics of a residual vibration caused by a change in the potential represented by the waveform PS1 to one side is significantly suppressed.

The control unit 2 corrects the waveform specifying signal dCom according to the temperature indicated by the temperature detection signal TI acquired from the temperature detector 5. The drive signal generating unit 4 corrects the length of the time period TPS1 based on the corrected waveform specifying signal dCom. In other words, the drive signal generating unit 4 corrects the length of the time period TPS1 according to the temperature detected by the temperature detector 5.

The higher the temperature of the head unit 3, the higher the temperature of the cavity 322 included in the ejecting section D[m] in the head unit 3. As a result, the temperature of the ink with which the cavity 322 is filled increases and the viscosity of the ink decreases. When the viscosity of the ink decreases, the length of the natural vibration period increases. As the length of the natural vibration period increases, the drive signal generating unit 4 increases the length of the time period TPS1. On the other hand, when the temperature of the head unit 3 decreases, the drive signal generating unit 4 reduces the length of the time period TPS1.

The drive signal generating unit 4 corrects the length of the time period TPS1 according to the reference potential V0. As described above, when the temperature of the ink with which the cavity 322 is filled increases, the viscosity of the ink decreases and the value of the potential VS1 illustrated in FIG. 8 decreases. In addition, the entire waveform PS illustrated in FIG. 8 is reduced in the vertical axis direction and the value of the reference potential V0 also decreases. Since the length of the natural vibration period increases, the drive signal generating unit 4 increases the length of the time period TPS1. In other words, when the value of the reference potential V0 decreases, the drive signal generating unit 4 increases the length of the time period TPS1. On the other hand, when the value of the reference potential V0 increases, the drive signal generating unit 4 reduces the length of the time period TPS1.

The control unit 2 corrects the waveform specifying signal dCom according to the characteristic information acquired as the acquirer. The drive signal generating unit 4 corrects the length of the time period PS1 based on the corrected waveform specifying signal dCom. In other words, the drive signal generating unit 4 corrects the length of the time period TPS1 according to the characteristic information acquired by the control unit 2. Specifically, it is expected that the longer the cumulative energization time indicated by the characteristic information, the longer the natural vibration period due to degradation of the piezoelectric element PZ[m] over time. Therefore, the drive signal generating unit 4 increases the length of the time period TPS1 as the cumulative energization time increases. However, as the piezoelectric element PZ[m] degrades over time, the length of the natural vibration period may decrease, depending on the material of the piezoelectric element PZ[m]. In this case, the drive signal generating unit 4 reduces the length of the time period TPS1 as the length of the cumulative energization time increases. Similarly, the drive signal generating unit 4 increases the length of the time period TPS1 as the number of supplied pulses indicated by the characteristic information increases. However, as the piezoelectric element PZ[m] degrades over time, the length of the natural vibration period may decrease, depending on the material of the piezoelectric element PZ[m]. In this case, the drive signal generating unit 4 reduces the length of the time period TPS1 as the number of supplied pulses increases.

In FIG. 8, the length of the time period TPS3 is equal to or shorter than 0.5×TC. When the length of the time period TPS3 is equal to or shorter than 0.5×TC, the potential represented by the waveform PS3 included in the drive signal Com-B rapidly changes from the potential VS1 to the potential VS2, as compared with a change in the potential represented by the waveform PS1 from the reference potential V0 to the potential VS1. As a result, an effect of one vibration occurring in the ejecting section D[m] due to a change in the potential represented by the waveform PS1 to one side on another vibration occurring in the ejecting section D[m] due to a change in the potential represented by the waveform PS3 to the other side is suppressed. The ink jet printer 1 according to the present embodiment can accurately determine the ejection state of the ejecting section D[m], as compared with existing techniques.

In FIG. 8, the length of the detection period included in the time period TPS4 is equal to or longer than the length of the natural vibration period TC. Since the detecting circuit 33 detects a residual vibration of the piezoelectric element PZ[m] in the sufficiently long detection period, the ink jet printer 1 according to the present embodiment can accurately determine the ejection state of the ejecting section D[m], as compared with the existing techniques.

In FIG. 8, the length of the time period TPS5 is equal to or longer than 0.75×TC. The length of the time period TPS5 is preferably an integer multiple of the length of the natural vibration period TC.

Since the length of the time period TPS5 is equal to or longer than 0.75×TC, it is possible to suppress an effect of a vibration caused by a change in the potential represented by the waveform PS5 from the potential VS2 to the reference potential V0 on the ejecting section D adjacent to the determination target ejecting section DS. In addition, since the length of the time period TPS5 is equal to or longer than 0.75×TC, it is possible to suppress ejection of an unexpected droplet from the determination target ejecting section DS.

Alternatively, in FIG. 8, the length of the time period TPS1 may be longer than the length of the time period TPS5.

In the determination of the ejection state of the ejecting section D[m], an effect of one vibration caused by a change in the potential represented by the waveform PS1 from the reference potential V0 to the potential VS1 is larger than an effect of another vibration caused by a change in the potential represented by the waveform PS5 from the potential VS2 to the reference potential V0. Therefore, when the length of the time period TPS1 corresponding to the waveform PS1 is relatively longer than the length of the time period TPS5 corresponding to the waveform PS5, the ink jet printer 1 according to the present embodiment can accurately determine the ejection state of the ejecting section D[m], as compared with the existing techniques.

1-5. Effects of First Embodiment

As described above, the ink jet printer 1 as the liquid ejecting apparatus according to the present embodiment includes the ejecting section D, the drive signal generating unit 4 as the generator, and the detecting circuit 33 as the vibration detector. The ejecting section D ejects liquid within the cavity 322 as a pressure chamber according to deformation of the piezoelectric element PZ[m]. The drive signal generating unit 4 generates the drive signal Com-B as an inspection signal that deforms the piezoelectric element PZ[m]. The detecting circuit 33 detects a residual vibration occurring in the ejecting section D after the drive signal Com-B is supplied to the piezoelectric element PZ[m]. The drive signal Com-B includes the waveform PS1 as a first potential-changing element having a potential that changes from the reference voltage V0 as a first potential to the potential VS1 as a second potential in one direction in the time period TPS1 as a first time period, the waveform PS2 as a first potential-maintaining element having the potential VS1 maintained in the time period TPS2 as a second time period immediately after the time period TPS1, the waveform PS3 as a second potential-changing element having a potential that changes from the potential VS1 to the potential VS2 as a third potential in the other direction in the time period TPS3 as a third time period immediately after the time period TPS2, and the waveform PS4 as a second potential-maintaining element having the potential VS2 maintained in the time period TPS4 as a fourth time period immediately after the time period TPS3. When the natural vibration period of the ejecting section D is TC, the length of the time period TPS1 as the first time period is equal to or longer than 0.75×TC. The detecting circuit 33 as the vibration detector detects the residual vibration in the detection period included in the time period TPS4 as the fourth time period.

Therefore, the ink jet printer 1 can suppress variance in the characteristics of the residual vibration and improve the accuracy of determining the liquid ejection state of the ejecting section D[m], as compared with a case where the length of the time period TPS1 is shorter than 0.75×TC.

In the ink jet printer 1 according to the present embodiment, the reference voltage V0 as the first potential is between the potential VS1 as the second potential and the potential VS2 as the third potential.

Therefore, the ink jet printer 1 can significantly deform the piezoelectric element PZ[m] included in the ejecting section D[m].

In the ink jet printer 1 according to the present embodiment, when a number N is a natural number of 1 or more, the time period TPS1 as the first time period is equal to or longer than 0.75×N×TC and equal to or shorter than 1.25×N×TC.

Therefore, the ink jet printer 1 can suppress variance in the characteristics of the residual vibration and improve the accuracy of determining the liquid ejection state of the ejecting section D[m], as compared with a case where the length of the time period TPS1 is shorter than 0.75×TC.

In the ink jet printer 1 according to the present embodiment, the number N is 1 or 2.

Therefore, the ink jet printer 1 can suppress variance in the characteristics of the residual vibration and improve the accuracy of determining the liquid ejection state of the ejecting section D[m], as compared with a case where the length of the time period TPS1 is shorter than 0.75×TC.

In the ink jet printer 1 according to the present embodiment, the length of the time period TPS2 as the second time period is equal to or longer than the length of the natural vibration period TC.

Therefore, when the length of the time period TPS2 is equal to or longer than the length of the natural vibration period TC, variance in the characteristics of a residual vibration caused by a change in the potential represented by the waveform PS1 to one side is significantly suppressed.

The ink jet printer 1 according to the present embodiment further includes the temperature detector 5 that detects the temperature of the head unit 3 including the ejecting section D. The drive signal generating unit 4 as the generator corrects the length of the time period TPS1 as the first time period according to the temperature detected by the temperature detector 5.

Therefore, as the temperature detected by the temperature detector 5 increases, the temperature of the cavity 322 included in the ejecting section D in the head unit 3 increases and the viscosity of the ink with which the cavity 322 is filled decreases. The drive signal generating unit 4 can correct the length of the time period TPS1 according to the decrease in the viscosity of the ink.

In the ink jet printer 1 according to the present embodiment, the drive signal generating unit 4 as the generator corrects the length of the time period TPS1 as the first time period according to the reference potential V0 as the first potential.

Therefore, when the temperature of the ink with which the cavity 322 is filled increases, the value of the reference potential V0 decreases. The drive signal generating unit 4 can correct the length of the time period TPS1 according to the decrease in the value of the reference potential V0.

The ink jet printer 1 according to the present embodiment further includes the control unit 2 as the acquirer that acquires the characteristic information relating to the characteristics of the piezoelectric element PZ[m]. The drive signal generating unit 4 as the generator corrects the length of the time period TPS1 as the first time period according to the characteristic information acquired by the control unit 2.

Therefore, the ink jet printer 1 can support a change in the natural vibration period due to the degradation of the piezoelectric element PZ[m] over time.

In the ink jet printer 1 according to the present embodiment, the length of the time period TPS3 as the third time period is equal to or shorter than 0.5×TC.

The potential represented by the waveform PS3 included in the drive signal Com-B rapidly changes from the potential VS1 to the potential VS2, as compared with the change in the potential represented by the waveform PS1 from the reference potential V0 to the potential VS1. This suppresses an effect of one vibration occurring in the ejecting section D[m] due to a change in the potential represented by the waveform PS1 to one side on another vibration occurring in the ejecting section D[m] due to a change in the potential represented by the waveform PS3 to the other side. The ink jet printer 1 according to the present embodiment can accurately determine the ejection state of the ejecting section D[m], as compared with the existing techniques.

In the ink jet printer 1 according to the present embodiment, the length of the detection period is equal to or longer than TC.

Therefore, since the detecting circuit 33 detects the residual vibration of the piezoelectric element PZ[m] in the sufficiently long detection period, the ink jet printer 1 according to the present embodiment can accurately determine the ejection state of the ejecting section D[m], as compared with the existing techniques.

In the ink jet printer 1 according to the present embodiment, the drive signal Com-B as the inspection signal includes the waveform PS5 as the third potential-changing element having a potential that changes from the potential VS2 as the third potential to the reference potential V0 as the first potential in the time period TPS5 as the fifth time period immediately after the time period TPS4 as the fourth time period. The length of the time period TPS5 is equal to or longer than 0.75×TC.

Therefore, the ink jet printer 1 can suppress an effect of a vibration caused by a change in the potential represented by the waveform PS5 from the potential VS2 to the reference potential V0 on the ejecting section D adjacent to the determination target ejecting section DS.

In the ink jet printer 1 according to the present embodiment, the drive signal Com-B as the inspection signal includes the waveform PS5 as the third potential-changing element having a potential that changes from the potential VS2 as the third potential to the reference potential V0 as the first potential in the time period TPS5 as the fifth time period immediately after the time period TPS4 as the fourth time period. The length of the time period TPS1 as the first time period is longer than the length of the time period TPS5 as the fifth time period.

Therefore, since the length of the time period TPS1 corresponding to the waveform PS1 is relatively longer than the length of the time period TPS5 corresponding to the waveform PS5, the ink jet printer 1 can accurately determine the ejection state of the ejecting section D[m], as compared with the existing techniques.

In addition, as described above, the method of driving the ink jet printer 1 as the liquid ejecting apparatus according to the present embodiment is a method of driving the ink jet printer 1 having the ejecting section D, the drive signal generating unit 4 as the generator, and the detecting circuit 33 as the vibration detector. The ejecting section D ejects liquid within the cavity 322 as the pressure chamber according to deformation of the piezoelectric element PZ[m]. The drive signal generating unit 4 generates the drive signal Com-B as the inspection signal that deforms the piezoelectric element PZ[m]. The detecting circuit 33 detects a residual vibration occurring in the ejecting section D after the drive signal Com-B is supplied to the piezoelectric element PZ[m]. The drive signal Com-B includes the waveform PS1 as the first potential-changing element having a potential that changes from the reference potential V0 as the first potential to the potential VS1 as the second potential in the one direction in the time period TPS1 as the first time period, the waveform PS2 as the first potential-maintaining element having the potential VS1 maintained in the time period TPS2 as the second time period immediately after the time period TPS1, the waveform PS3 as the second potential-changing element having a potential that changes from the potential VS1 to the potential V2 as the third potential in the time period TPS3 as the third time period immediately after the time period TPS2, and the waveform PS4 as the second potential-maintaining element having the potential VS2 maintained in the time period TPS4 as the fourth time period immediately after the time period TPS3. When the natural vibration period of the ejecting section D is TC, the length of the time period TPS1 as the first time period is equal to or longer than 0.75×TC. The detecting circuit 33 as the vibration detector detects the residual vibration in the detection time period included in the time period TPS4 as the fourth time period.

Therefore, the ink jet printer 1 can suppress variance in the characteristics of the residual vibration and improve the accuracy of determining the ejection state of the ejecting section D[m], as compared with a case where the length of the time period TPS1 is shorter than 0.75×TC.

2. Modifications

The embodiments described above can be variously modified. Specific aspects of modifications are exemplified as follows. The aspects exemplified below and the aspects described above in the embodiments can be combined as appropriate to the extent that the combined aspects are not mutually inconsistent. In the modifications exemplified below, components that have the same effects and functions as those described in the embodiments are denoted by the same reference signs as those described above, and description of the components are omitted as appropriate.

2-1. First Modification

In the above-described embodiment, as illustrated in FIG. 8, the potential VS1 is higher than the reference potential V0 and the potential VS2 is lower than the reference potential V0. However, in a first modification, the potential VS1 may be lower than the reference potential V0 and the potential VS2 may be higher than the reference potential V0. In this case, the waveform S1 and the waveform PS5 are waveforms for deforming the piezoelectric element PZ[m] in the −Z direction, and the waveform PS3 is a waveform for deforming the piezoelectric element PZ[m] in the +Z direction.

What is claimed is:

1. A liquid ejecting apparatus comprising:

an ejecting section that is configured to eject liquid within a pressure chamber according to deformation of a piezoelectric element;

a generator that is configured to generate an inspection signal that deforms the piezoelectric element; and a vibration detector that is configured to detect a residual vibration occurring in the ejecting section after the inspection signal is supplied to the piezoelectric element, wherein the inspection signal includes a first potential-changing element having a potential that changes from a first potential to a second potential in one direction in a first time period, a first potential-maintaining element having the second potential maintained in a second time period immediately after the first time period, a second potential-changing element having a potential that changes from the second potential to a third potential in the other direction in a third time period immediately after the second time period, and a second potential-maintaining element having the third potential maintained in a fourth time period immediately after the third time period, when a natural vibration period of the ejecting section is TC, a length of the first time period is equal to or longer than 0.75×TC, and the vibration detector detects the residual vibration in a detection period included in the fourth time period.

2. The liquid ejecting apparatus according to claim 1, wherein the first potential is between the second potential and the third potential.

3. The liquid ejecting apparatus according to claim 1, wherein when a number N is a natural number of 1 or more, the length of the first time period is equal to or longer than 0.75×N×TC and equal to or shorter than 1.25×N×TC.

4. The liquid ejecting apparatus according to claim 3, wherein the number N is 1 or 2.

5. The liquid ejecting apparatus according to claim 1, wherein a length of the second time period is equal to or longer than TC.

6. The liquid ejecting apparatus according to claim 1, further comprising a temperature detector that is configured to detect a temperature of a head unit including the ejecting section, wherein the generator corrects the length of the first time period according to the temperature detected by the temperature detector.

7. The liquid ejecting apparatus according to claim 1, wherein the generator corrects the length of the first time period according to the first potential.

8. The liquid ejecting apparatus according to claim 1, further comprising an acquirer that is configured to acquire characteristic information relating to a characteristic of the piezoelectric element, wherein the generator corrects the length of the first time period according to the characteristic information acquired by the acquirer.

9. The liquid ejecting apparatus according to claim 1, wherein a length of the third time period is equal to or shorter than 0.5×TC.

10. The liquid ejecting apparatus according to claim 1, wherein a length of the detection period is equal to or longer than TC.

11. The liquid ejecting apparatus according to claim 1, wherein the inspection signal includes a third potential-changing element having a potential that changes from the third potential to the first potential in a fifth time period immediately after the fourth time period, and a length of the fifth time period is equal to or longer than 0.75×TC.

12. The liquid ejecting apparatus according to claim 1, wherein the inspection signal includes a third potential-changing element having a potential that changes from the third potential to the first potential in a fifth time period immediately after the fourth time period, and the length of the first time period is longer than a length of the fifth time period.

13. A method of driving a liquid ejecting apparatus including an ejecting section that is configured to eject liquid within a pressure chamber according to deformation of a piezoelectric element, a generator that is configured to generate an inspection signal that deforms the piezoelectric element, and a vibration detector that is configured to detect a residual vibration occurring in the ejecting section after the inspection signal is supplied to the piezoelectric element, the method comprising:

causing the generator to generate the inspection signal including a first potential-changing element having a potential that changes from a first potential to a second potential in one direction in a first time period, a first potential-maintaining element having the second potential maintained in a second time period immediately after the first time period, a second potential-changing element having a potential that changes from the second potential to a third potential in the other direction in a third time period immediately after the second time period, and a second potential-maintaining element having the third potential maintained in a fourth time period immediately after the third time period; and causing the vibration detector to detect the residual vibration in a detection period included in the fourth time period, wherein when a natural vibration period of the ejecting section is TC, a length of the first time period is equal to or longer than 0.75×TC.

* * * * *